Figure 1:
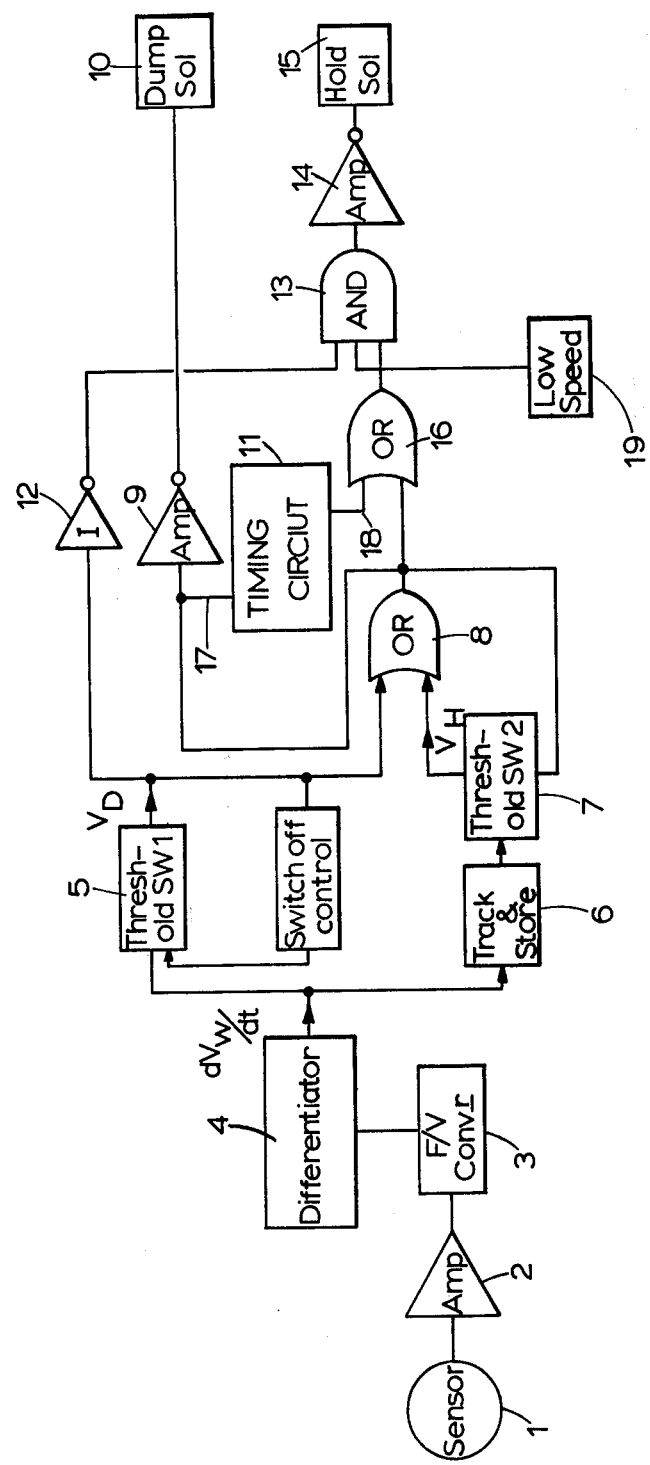

United States Patent [19]

Brearley

[11] 4,209,203

[45] Jun. 24, 1980

[54] ANTI-SKID BRAKE CONTROL SYSTEM

[75] Inventor: Malcolm Brearley, Solihull, England

[73] Assignee: Girling Limited, Birmingham, England

[21] Appl. No.: 932,307

[22] Filed: Aug. 9, 1978

[30] Foreign Application Priority Data

Aug. 10, 1977 [GB] United Kingdom .............. 33457/77

[51] Int. Cl.² ............................................. B60T 8/02
[52] U.S. Cl. ..................................... 303/110; 303/103
[58] Field of Search ................ 303/110, 103, 105, 106

[56] References Cited

U.S. PATENT DOCUMENTS

| 4,033,634 | 7/1977 | Arai | 303/110 |
|---|---|---|---|
| 4,054,328 | 10/1977 | Leiber | 303/103 |

Primary Examiner—Barry L. Kelmachter
Assistant Examiner—Reinhard J. Eisenzopf
Attorney, Agent, or Firm—Scrivener, Parker, Scrivener and Clarke

[57] ABSTRACT

An anti-skid brake control system has a brake pressure control unit for producing a release signal to trigger the release of brake pressure and a subsequent re-apply signal to trigger the re-application of brake pressure in successive brake pressure release/re-apply cycles; and a change-over control unit for producing a change-over signal to trigger a change from a first, rapid re-apply stage, in which brake pressure is re-applied rapidly, to a second, slow re-apply stage in which brake pressure is re-applied slowly, during the re-apply period of each cycle; the change-over control unit including a storing device responsive to the duration of the re-apply period in successive cycles so that the change-over point in each cycle is controlled in a manner dependent on the duration of the re-apply period in the preceding cycle, whereby the duration of the re-apply period is dynamically adjusted to assume a preset value. Preferably, the change-over point in each cycle is further controlled in a manner dependent on the duration of the brake release period of that cycle so that the duration of the brake release and brake re-apply periods change in same sense.

7 Claims, 6 Drawing Figures

ANTI-SKID BRAKE CONTROL SYSTEM

SPECIFIC DESCRIPTION

This invention relates to an anti-skid brake control system.

Skidding of a braked wheel can be controlled by sensing the angular acceleration of the wheel and releasing the brakes when a deceleration level corresponding to incipient wheel skid is detected, and re-applying the brakes, preferably at or near the detected peak acceleration level during consequent wheel speed recovery, when the brake force co-efficient is at a maximum. Generally a succession of brake release/re-apply cycles occurs as the vehicle speed is reduced to a level at which the applied brake force no longer induces wheel skid.

Re-application of the brake in each release/re-apply cycle is preferably carried out as rapidly as possible in order that the brake should be effective to a maximum extent, but not so rapidly as to increase the chances of a wheel skid being induced. In an attempt to meet these requirements it has been proposed to re-apply the brakes in two stages comprising increasing the applied brake force first rapidly and then more slowly. However, the rapid apply stage has been of fixed duration, predetermined according to the typical, expected skid conditions, and this has necessarily meant that braking efficiency has been reduced when skid conditions varied from those expected, for example when the wheel contacts high or low $\mu$ surfaces.

The present invention consists in an anti-skid brake control system in which brake re-application in successive brake release/re-apply cycles is controlled so that it comprises a rapid re-apply stage followed by a slow re-apply stage with the change-over point between the two stages controlled in a manner dependent on the duration of the brake re-apply period in the preceding cycle so that the duration of the brake re-apply period is dynamically adjusted to assume a preset value, a longer re-apply period in one cycle producing a shorter re-apply period in the next cycle and vice versa.

The ratio of the duration of the rapid and slow stages in the adjusted re-apply period is suited to the prevailing frictional surface conditions by virtue of the fact that said frictional surface conditions determine the degree of brake re-application possible before the next brake release period is signalled, and said degree of brake re-application can only be achieved in said preset brake re-apply period by certain proportions of rapid and slow brake re-application. For example, under low frictional surface conditions, only limited brake re-application is possible as compared with normal frictional surface conditions, and thus the proportion of rapid brake re-application is reduced and the proportion of slow brake re-application is increased.

Further, said preset duration of the brake re-apply period is preferably modified in accordance with the duration of the brake release period so that it changes in the same sense, that is, an increase in the brake release period (indicative of low frictional surface conditions) produces a shortened rapid re-apply stage and a correspondingly lengthened slow re-apply stage, and a decrease in the brake release period (indicative of high frictional surface conditions) produces a lengthened rapid re-apply stage and a correspondingly shortened slow re-apply stage.

The invention therefore provides an anti-skid brake control system in which two-stage brake re-application is controlled so as to suit frictional surface conditions and give maximum braking efficiency. No assumptions about the brake characteristics of the particular vehicle being stopped are involved, and thus the system is suitable for all vehicles.

According to a further, preferred feature of the invention, the slow brake re-apply stage is terminated at a preset level if no brake release period is triggered before then, and a third, rapid brake re-apply stage is established. Thus, instead of continuing the slow brake re-apply stage until another brake release period is triggered or until full brake pressure is re-applied, as in the known two-stage brake re-apply systems, the lack of another brake release period before said preset level is attained, is taken to indicate that frictional surface conditions have improved and the brake can be safely re-applied rapidly.

In a preferred embodiment of the invention, a timer circuit is used to trigger the change-over between the rapid and slow brake re-apply stages; the timer comprising a first capacitor that discharges at the transition between the brake release and brake re-apply periods and which charges linearly thereafter, a second capacitor that discharges exponentially during the brake release period and charges exponentially during the brake re-apply period, and a comparator circuit that compares input voltages produced by the two capacitors and triggers the rapid/slow change-over when they are coincident.

Preferably, the rate of charge of the first capacitor is changed from a high rate to a low rate at the rapid/slow change-over point, and a second comparator circuit is provided which triggers a second change-over from slow brake re-apply to rapid brake re-apply when the charge on the capacitor reaches a fixed level above the first trigger level. Thus, if a new brake release/re-apply cycle is not triggered, the timer will trigger a third rapid brake re-apply stage following said first rapid and second slow brake re-apply stages.

Figure 2:
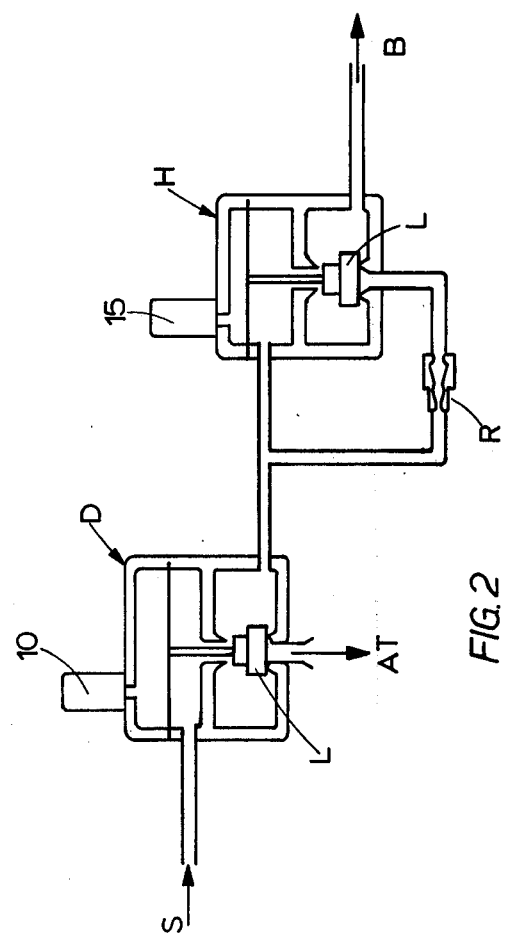
Figure 3:
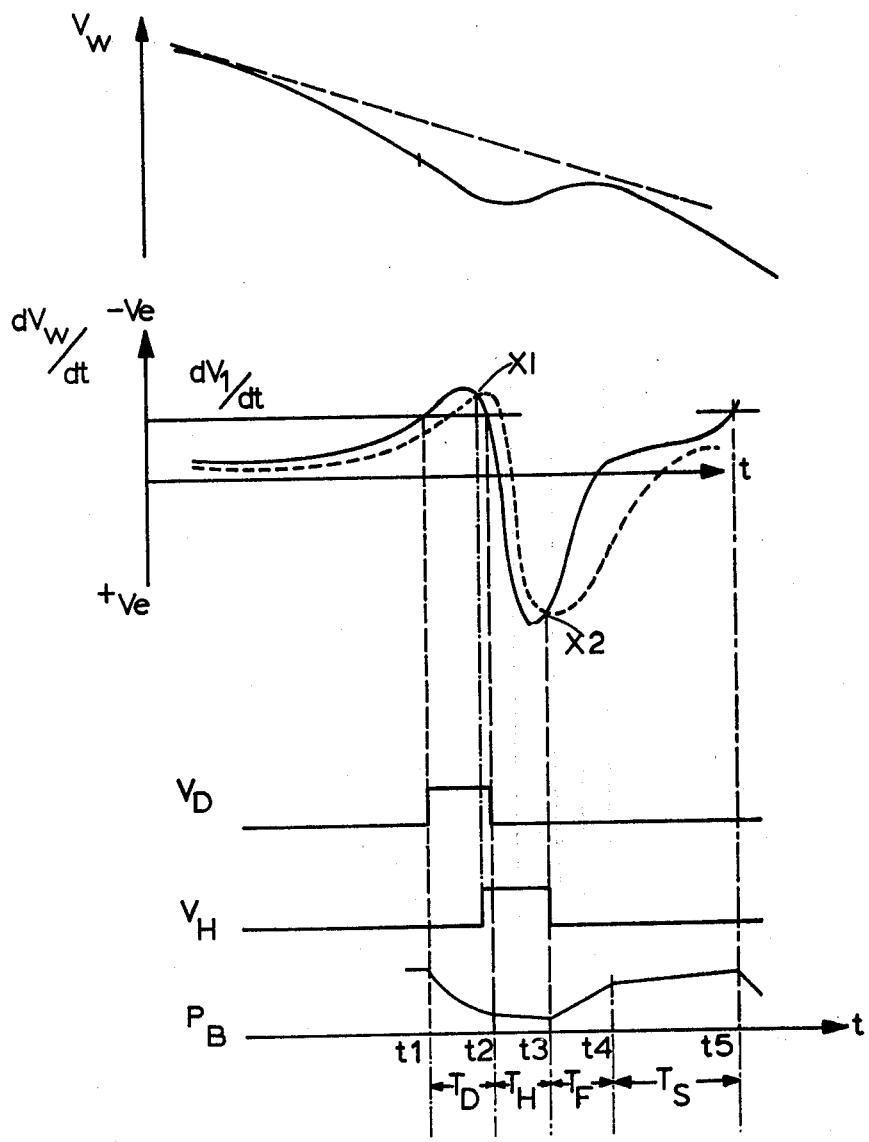
Figure 4:
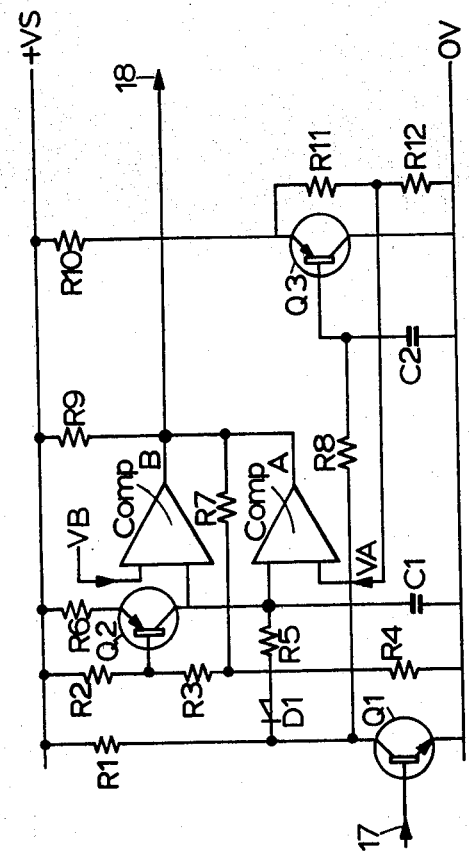
Figure 5:
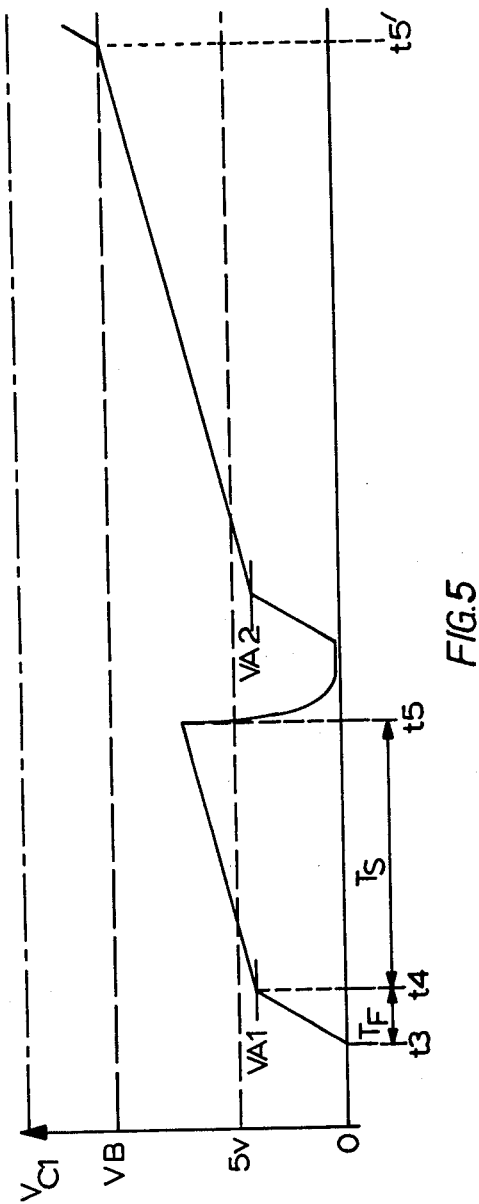
Figure 6:
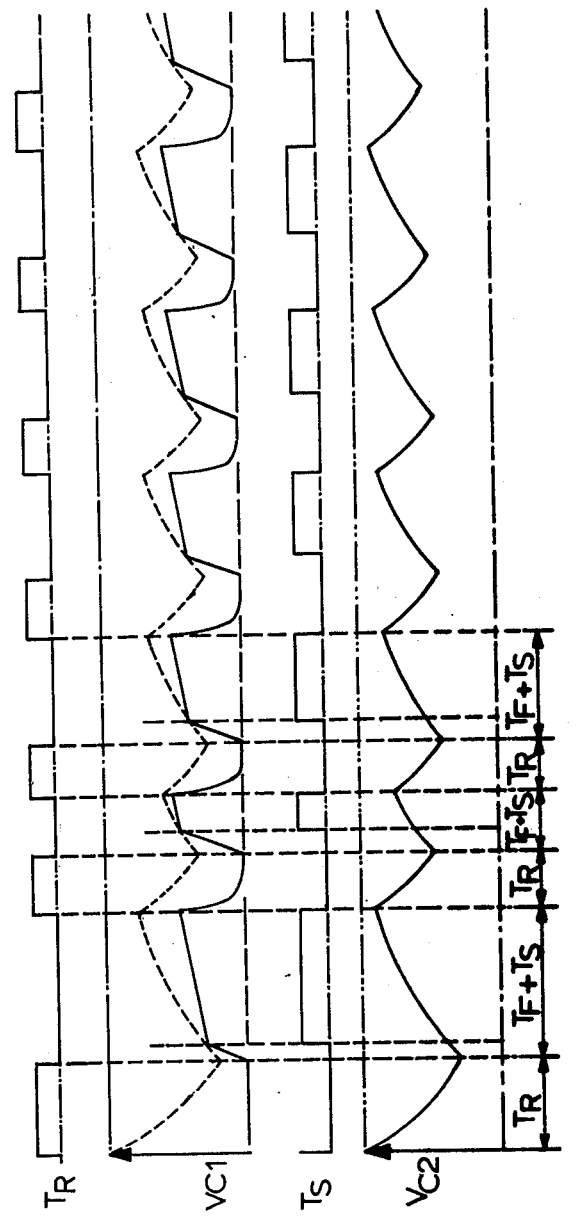

The invention will now be described by way of example with reference to the accompanying drawings in which FIG. 1 is a schematic diagram showing an anti-skid brake control system according to the invention, FIG. 2 is a schematic diagram showing two fluid valves controlled by the system of FIG. 1, FIG. 3 shows wheel speed and deceleration curves and corresponding response curves for the system of FIGS. 1 and 2, FIG. 4 is the circuit diagram of the timing circuit in FIG. 1, FIG. 5 shows a curve of the potential on a capacitor $V_{c1}$ in the timing circuit of FIG. 4, and FIG. 6 shows response curves for the system of FIG. 1 over several successive brake release/re-apply cycles.

The complete anti-skid brake control system is shown in FIG. 1 including the solenoids of a solenoid-operated dump valve D and a solenoid operated hold valve H that are connected in the fluid supply line to the brakes B, as shown in FIG. 2.

The control system shown in FIG. 1 comprises a wheel or axle speed sensor 1 and an input amplifier 2 designed to produce fixed amplitude square wave pulses with a repetition rate proportional to the speed of the wheel or axle. A frequency/voltage converter 3 acts on the edges of these pulses to produce a dc voltage $V_w$ proportional to the wheel speed w, and this wheel speed signal passes to a linear differentiator circuit 4 which produces a signal $dV_w/dt$ proportional to the deceleration and acceleration of the wheel or axle. The differentiator 4 also includes filtering means to remove the unwanted signal components produced by the converter 3. FIG. 3 shows typical signals $V_w$ and $dV_w/dt$ for an anti-skid brake release/re-apply cycle.

The acceleration/deceleration signal $dV_w/dt$ from the differentiator 4 is fed to a first threshold switch 5 that compares the signal $dV_w/dt$ with a preset threshold value $dV_1/dt$, corresponding to incipient skid conditions, and produces a control signal $V_D$ (FIG. 3) between times t1 and t2 while this skid threshold is exceeded, which signal triggers rapid brake release as described hereinbelow.

The acceleration/deceleration signal $dV_w/dt$ is also fed to a track and store circuit 6 comprising a charging circuit that is responsive to the acceleration/deceleration signal $dV_w/dt$ and produces a corresponding output signal $dV_o/dt$ whose amplitude follows that of the acceleration/deceleration signal so that the amplitude-time curves of the two signals cross-over one another shortly after the deceleration peak and subsequent acceleration peak during a brake release cycle, as shown at X1 and X2 in FIG. 3. A second threshold switch 7 compares the acceleration/deceleration signals $dV_w/dt$ and the output signal $dV_o/dt$ from the track and store circuit 6 and produces a control signal $V_H$ (FIG. 3) between the two cross-over points X1, X2, the termination of the brake release or hold signal at time t3 at the second cross-over point X2 serving to trigger re-application of the brakes, as described hereinbelow.

This part of the anti-skid brake control system comprising the threshold switch 5 and track and store circuit 6 and threshold switch 7 forms the subject matter of U.S. Pat. No. 4,146,276 and reference should be made to that Patent for more detailed information.

The threshold switch 5 produces the control signal $V_D$ during the period t1 to t2 while said preset deceleration threshold $dV_1/dt$ is exceeded and this signal passes via an OR gate 8 and an amplifier 9 to energise the solenoid 10 of the dump valve D. The dump valve D therefore operates so that its plunger L is raised from the position shown in FIG. 2, to cut-off the fluid supply S to the brakes and release fluid pressure from the brakes B to atmosphere AT. Brake pressure $P_B$ therefore falls rapidly in the dump period $T_D$ as shown in FIG. 3.

The control signal $V_D$ from switch 5 also resets the timing circuit 11 (as described hereinbelow), and acts through an inverter 12 and AND gate 13 and amplifier 14 to inhibit energisation of the solenoid 15 of the hold valve H.

The control signal $V_H$ from the threshold switch 7 commences after commencement of the control signal $V_D$ from the switch 5 and overlaps the latter. This control signal $V_H$ passes via the OR gate 8 and amplifier 9 to the solenoid 10 of the dump valve D, and passes via the OR gate 8 and a further OR gate 16 to the AND gate 13. Thus, when the control signal $V_D$ from switch 5 terminates at time t2, the control signal $V_H$ from switch 7 continues to energise the solenoid 10 of the dump valve 10. Furthermore, termination of the control signal $V_D$ from switch 5 removes the inhibit to the AND gate 13, whereupon the control signal $V_H$ from switch 7 passes therethrough to energise the solenoid 15 of the hold valve 10. The dump valve D and hold valve H are therefore operated together, in which state the plungers L of both are held in the raised position so that fluid from the brakes B escapes to atmosphere AT via a restricted by-pass passage R controlled by the hold valve H. Brake pressure $P_B$ therefore decays slowly during the hold period $T_H$, as shown in FIG. 3.

The control signal $V_H$ also acts on the timing circuit 11, like the control signal $V_D$, to hold it in the reset state.

When the control signal $V_H$ terminates at time t3, both valves are released and assume the states shown in FIG. 2, in which the brakes B are reconnected to the fluid supply S. Brake pressure $P_B$ then increases rapidly, as shown in FIG. 3. If now, the hold valve H alone is operated, the fluid supply S is connected to the brakes B via the restricted by-pass R so that brake pressure $P_B$ increases slowly rather than rapidly. The timer circuit 11 controls operation of the hold valve H via the OR gate 16, AND gate 13, amplifier 14 and hold solenoid 15, the timing circuit 11 timing a period $T_F$ commencing at time t3 when the control signal $V_H$ terminates, and producing an output signal to operate the hold valve H at time t4 once the period $T_F$ has terminated. Therefore, when the brakes are re-applied, brake pressure is first re-applied rapidly during a fast re-apply period $T_F$ and is then re-applied slowly thereafter during a slow re-apply period $T_S$.

The timing circuit 11 is shown in FIG. 4 and comprises a capacitor C1 that is discharged and held discharged via a resistor R5, diode D1 and transistor Q1 while the transistor is driven to conduct by either control signal $V_D$ or $V_H$ at the input 17 to the base of transistor Q1. When brake re-application is signalled at time t3 by the termination of the control signal $V_H$, capacitor C1 begins to charge linearly from a constant current source formed by a transistor Q2 and resistors R2, R3 and R6.

The potential $V_{C1}$ on capacitor C1 is applied to the inputs of two comparators COMP A and COMP B that each compare this potential with a respective reference potential $V_A$ and $V_B$. Potential $V_A$ is a threshold voltage variable in the range, typically 0 to 5 volts, whereas $V_B$ is a reference voltage, typically fixed at 12 volts. The comparators are arranged so that the output stage of COMP A conducts only while $V_{C1}$ is below the threshold $V_A$, and the output stage of COMP B conducts only while $V_{C1}$ is above the threshold $V_B$. Thus, initially, on brake re-application, COMP A conducts, whereupon the common OR-wired output of the comparators goes low, and this acts through the resistors R3, R4 and R7 to set a relatively high charging current for capacitor C1. The potential $V_{C1}$ therefore rises rapidly initially, during the fast brake re-apply period $T_F$ as shown in FIG. 5.

When $V_{C1}$ exceeds the threshold $V_A$ at time t4, COMP A stops conducting and the output voltage of the comparators rises to produce an output signal at output 18 that operates the hold valve H to change from fast brake re-apply to slow brake re-apply. The increase in the output voltage of the comparators also increases the base voltage on transistor Q2, thereby reducing the charging current for capacitor C1 so that the potential $V_{C1}$ rises more slowly during the slow brake re-application period $T_S$, as shown in FIG. 5.

FIGS. 3 and 5 both show a situation in which the slow brake re-application period $T_S$ is terminated by the threshold switch 5 triggering a new brake release/re-apply cycle, the control signal $V_D$ triggering brake pressure release and resetting the timing circuit 11 so that C1 is discharged by transistor Q1. However, if a new brake release/re-apply cycle is not triggered, the potential $V_{C1}$ will continue to rise slowly, taking several seconds to reach the second comparator threshold $V_B$, as shown in a second cycle in FIG. 5. Once $V_{C1}$ exceeds $V_B$, COMP B conducts, thereby reducing the output voltage and terminates the output signal to the hold valve H. The hold valve H therefore resets and brake pressure is re-applied rapidly, as from time t5 in FIG. 5.

The hold valve H is also controlled by a low speed detector 19 (see FIG. 1) that applies an enable signal to the AND gate 13 to allow operation of the hold valve H all the time a vehicle speed is above a preset minimum level. However, if the vehicle speed falls below this minimum level, the enable signal is removed and the hold valve H is released so that the system reverts to fast brake re-application.

As stated above, the threshold potential $V_A$ is varied, typically in the range 0 to 5 volts as shown on FIG. 5. Threshold level $V_A$ is varied so as to adjust the fast/slow change-over point t4 in accordance with the duration of the brake re-apply period in the preceding cycle, thereby dynamically adjusting the duration of the brake re-apply period so that it assumes a preset value suited to the prevailing frictional surface conditions.

The threshold potential $V_A$ is produced by a second capacitor C2 that is controlled by the transistor Q1 so that it discharges exponentially during the brake release period $T_D+T_H$, and is otherwise charged exponentially during the brake re-application period $T_F+T_S$ and any inter-cycle delay period. Capacitor C2 discharges via a resistor R8 and transistor Q1 when the latter is made conducting by the control signals $V_D$ and $V_H$, and charges via resistors R1 and R8 when transistor Q1 is non-conducting. The time constant of R8, C2 is substantially longer than the normal brake release/re-apply cycle so as to provide a suitable control signal. The voltage $V_{C2}$ is tapped via a buffer transistor Q3 and a potential divider R11, R12 to produce the corresponding threshold potential $V_A$ to the reference input of comparator COMP A.

FIG. 6 illustrates how the system operates over several brake release/re-apply cycles, and shows the potential curves for $V_{C1}$ and $V_{C2}$ and the corresponding brake release periods $T_R=T_D+T_H$ and slow brake re-apply periods $T_S$. The curve for the threshold potential $V_A$ corresponding to $V_{C2}$ is shown superimposed on the curve for $V_{C1}$ so that the fast/slow braking change-over points at which $V_{C1}=V_A$ can be seen.

FIG. 6 shows how the capacitor potential $V_{C2}$ (and thus $V_A$) at the end of each cycle is dependent on the length of the brake re-apply period $T_F+T_S$ during which it has just been charged, and affects the position of the change-over point in the next cycle as the capacitor C2 is again discharged and charged. For example, during the first cycle in FIG. 6, the re-apply period $T_F+T_S$ is longer than a preset value and causes the potential $V_{C2}$ to be high at the beginning of the second cycle, whereupon there is a longer fast brake re-apply period $T_F$ in the second cycle before $V_{C1}$ equals $V_A$ and the change-over point is triggered. The following slow brake re-apply period $T_S$ is therefore correspondingly shortened, provided the frictional surface conditions have not changed, and each cycle is triggered at the same braking level. Thus, the brake re-apply period $T_F+T_S$ is made shorter in the second cycle.

However, the brake re-apply period $T_F+T_S$ in the second cycle is shorter than said preset value, and thus $V_{C2}$ does not rise high during the second cycle, and the change-over point in the third cycle occurs sooner giving a shorter fast re-apply period $T_F$ and a longer slow re-apply period $T_S$. The brake re-apply period is therefore lengthened slightly in the third cycle and more nearly assumes said preset value.

Thus, under set frictional surface conditions, the system dynamically adjusts $V_A$ to give an equilibrium condition in which the brake re-apply period $T_F+T_S$ assumes a preset value, under which conditions the capacitor C2 is charged and discharged by the same amount during successive brake release and re-apply periods, the change-over point always being triggered at the same level.

The ratio of the durations $T_F$ and $T_S$ of the fast and slow brake re-apply stages in the adjusted re-apply period is suited to the prevailing frictional surface conditions by virtue of the fact that said frictional surface conditions determine the degree of brake re-application possible before the next brake release period is signalled, and said degree of brake re-application can only be achieved in said preset brake re-apply period by certain proportions of fast and slow brake re-application. For example, under low frictional surface conditions, only limited brake re-application is possible as compared with normal frictional surface conditions, and thus the proportion of fast brake re-application is reduced and the proportion of slow brake re-application is increased.

FIG. 6 also shows how the fall in potential $V_{C2}$ depends upon the length of the brake release period $T_R$ during each cycle, and affects the length of the brake re-apply period $T_F+T_S$ in the next cycle during which $V_{C2}$ rises again to trigger the change-over between fast and slow brake re-application. In particular, an increase in the release period $T_R$ produces a larger drop in the potential $V_{C2}$ so that only a small rise is necessary in $V_{C2}$ before the change-over point is triggered in the next cycle. There is therefore a shorter fast re-apply period $T_F$ and a longer slow re-apply period $T_S$ in the next cycle, resulting in an increased re-apply period overall. Similarly, a decrease in the release period $T_R$ will produce an overall decrease in the re-apply period in the next cycle. The length of the re-apply period therefore changes in the same sense as the change in the release period.

A change in the frictional surface properties will result in changes in the brake release period that will produce corresponding changes in the brake re-application period. For example, if there is a sudden drop in road adhesion, the system will reduce the fast brake re-apply period so as to give optimum braking.

I claim:

1. An anti-skid brake control system comprising brake pressure control means for producing a release signal to trigger the release of brake pressure and a subsequent re-apply signal to trigger the re-application of brake pressure in successive brake pressure release/re-apply cycles; and change-over control means for producing during a brake re-apply period a change-over signal to trigger a change from a first, rapid re-apply stage of said re-apply period, in which brake pressure is re-applied rapidly, to a second, slow re-apply stage of said re-apply period in which brake pressure is re-applied slowly; the change-over control means comprising storing means responsive to the duration of the re-apply period in successive cycles so that the change-over point in each cycle is controlled in a manner dependent on the duration of the re-apply period in the preceding cycle, whereby the duration of the re-apply period is dynamically adjusted to assume a preset value; said change-over control means comprising a first signal generator that is triggered at the beginning of the re-apply period and produces a first signal that varies progressively in a predetermined manner, a second signal generator including said storing means that produces a second signal that varies progressively in a predetermined manner in one sense during each release period and in the opposite sense during each re-apply period, and comparator means that compares said first and second signals and produces a change-over signal to trigger said change-over when the two signals are coincident.

2. A system as claimed in claim 1 in which the first signal changes progressively in a linear manner in one sense from a predetermined level at the beginning of the re-apply period, and the second signal changes progressively in a non-linear manner in the same sense as said first signal during the re-apply period, and changes progressively in a non-linear manner in the opposite sense during the release period.

3. A system as claimed in claim 2 in which the first signal generator includes a first capacitor that is charged from a predetermined potential level at the beginning of the re-apply period, and the second signal generator includes a second capacitor that is discharged exponentially towards said predetermined potential level during the release period and is charged exponentially during the re-apply period.

4. A system as claimed in claim 1 in which the change-over control means comprises a second comparator that compares said first signal with a fixed reference signal and produces a second change-over signal that triggers a change-over from said slow re-apply stage to a second rapid re-apply stage of said brake re-apply period when said first signal is coincident with said fixed reference signal.

5. A system a claimed in claim 4 in which the first signal generator produces a first signal that varies progressively at a first preset rate during the first, rapid re-apply stage and at a second, lower preset rate during the slow re-apply stage.

6. An anti-skid brake control system comprising brake pressure control means for producing a release signal to trigger the release of brake pressure and a subsequent re-apply signal to trigger the re-application of brake pressure in successive brake pressure release/re-apply cycles; and change-over control means for producing during a brake re-apply period a change-over signal to trigger a change from a first, rapid re-apply stage of said re-apply period, in which brake pressure is re-applied rapidly, to a second, slow re-apply stage of said re-apply period in which brake pressure is re-applied slowly; the change-over control means comprising storing means responsive in each cycle to the duration of the re-apply period in the preceding cycle and to the duration of the brake pressure release period of the current cycle, whereby the duration of the fast re-apply stage of the current cycle is increased in response to an increased duration of the re-apply period of the preceding cycle and is decreased in response to an increased duration of the release period of the current cycle, thereby dynamically adjusting the duration of the re-apply period to assume a preset value appropriate to the prevailing frictional surface conditions.

7. A system as claimed in claim 6 comprising further change-over control means for producing during a brake release period a further change-over signal to trigger a change from a rapid brake pressure release stage of said brake release period, in which brake pressure is relieved rapidly, to a hold stage of said brake release period, in which brake pressure is held substantially constant, said storing means being responsive to the sum of the duration of said rapid brake pressure release and the duration of said hold stage, whereby the duration of said fast re-apply stage of the current cycle is decreased in response to an increase of said sum.

* * * * *